United States Patent
Mirassou et al.

(10) Patent No.: US 9,739,228 B2
(45) Date of Patent: Aug. 22, 2017

(54) METHOD FOR COMMUNICATING A MALFUNCTION OF A SYSTEM FOR MEASURING SPEED AND DIRECTION OF ROTATION OF A ROTARY SHAFT

(71) Applicants: CONTINENTAL AUTOMOTIVE FRANCE, Toulouse (FR); CONTINENTAL AUTOMOTIVE GmbH, Hannover (DE)

(72) Inventors: David Mirassou, Toulouse (FR); Alain Gonzalez, Castelginest (FR); Benjamin Marconato, Toulouse (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 127 days.

(21) Appl. No.: 14/843,463

(22) Filed: Sep. 2, 2015

(65) Prior Publication Data
US 2016/0108842 A1  Apr. 21, 2016

(30) Foreign Application Priority Data
Oct. 16, 2014  (FR) ..................... 14 59923

(51) Int. Cl.
*G01D 5/14* (2006.01)
*F02D 41/00* (2006.01)
(Continued)

(52) U.S. Cl.
CPC ....... *F02D 41/222* (2013.01); *F02D 41/0097* (2013.01); *G01D 5/14* (2013.01);
(Continued)

(58) Field of Classification Search
CPC .............. G01D 5/142; G01D 5/24476; G01D 5/24466; G01P 3/44; G01M 15/06
See application file for complete search history.

(56) References Cited

U.S. PATENT DOCUMENTS 3,732,494 A  *  5/1973  Dragon ................... G01P 3/488
                                                   324/173
3,793,545 A  *  2/1974  Leiber .................... G01P 3/488
                                                   310/168
(Continued)

FOREIGN PATENT DOCUMENTS

FR  2 985 035 A1  6/2013
JP  H06-137894 A  5/1994

OTHER PUBLICATIONS

French Search Report, dated Jun. 2, 2015, for corresponding French Application.

*Primary Examiner* — David A Rogers
(74) *Attorney, Agent, or Firm* — Young & Thompson (57) ABSTRACT

The subject of the present invention is a method for communicating a malfunction of a system for measuring speed and direction of rotation of a rotary shaft, said system comprising:
- a toothed wheel associated with said rotary shaft, called target (14),
- a magnetic field sensor (10'), measuring values (K, A) of the magnetic field (B, B', B") generated by the passage of the teeth (T1, T2 . . . Ti) in front of said sensor (10') and delivering a signal (S, S', S") to processing means 13).

According to the invention, the method comprises the following steps:
- step 1: comparison by the sensor between the measured values and predetermined threshold values of the magnetic field,
(Continued)

step 2: if the measured values are below the predetermined threshold values, step 3: generation by the sensor of a coding on the signal, representative of the measured values, to communicate a malfunction of the system to the processing means.

12 Claims, 5 Drawing Sheets

(51) Int. Cl.
| | |
|---|---|
| *F02D 41/22* | (2006.01) |
| *G01D 18/00* | (2006.01) |
| *G01P 3/44* | (2006.01) |
| *G01P 21/00* | (2006.01) |
| *G01P 13/04* | (2006.01) |
| *G01D 5/244* | (2006.01) |
| *G01P 3/487* | (2006.01) |
| *G01P 3/488* | (2006.01) |
| *G01D 5/245* | (2006.01) |

(52) U.S. Cl.
CPC ......... *G01D 5/24466* (2013.01); *G01D 18/00* (2013.01); *G01P 3/44* (2013.01); *G01P 3/487* (2013.01); *G01P 3/488* (2013.01); *G01P 13/045* (2013.01); *G01P 21/00* (2013.01); *G01D 5/2451* (2013.01)

(56) References Cited

U.S. PATENT DOCUMENTS

| | | | | |
|---|---|---|---|---|
| 4,045,738 A | * | 8/1977 | Buzzell | G01P 3/488 324/174 |
| 4,262,251 A | * | 4/1981 | Fujishiro | F02P 17/02 324/166 |
| 4,331,917 A | * | 5/1982 | Render | G01P 13/045 324/166 |
| 4,670,715 A | * | 6/1987 | Fuzzell | G01P 1/00 324/174 |
| 4,814,704 A | * | 3/1989 | Zerrien, Jr. | G01P 3/488 324/207.12 |
| 5,041,979 A | * | 8/1991 | Hirka | F02P 7/0775 701/102 |
| 5,606,257 A | * | 2/1997 | Krauter | F02P 7/067 324/166 |
| 6,931,317 B2 | * | 8/2005 | Bruns | F02D 41/0097 701/102 |
| 7,133,764 B2 | * | 11/2006 | Kassner | F02D 41/009 123/179.4 |
| 7,216,030 B2 | * | 5/2007 | Kassner | F02D 41/009 324/165 |
| 7,369,960 B2 | * | 5/2008 | Blossfeld | G01D 5/24476 700/302 |
| 7,772,837 B2 | * | 8/2010 | Kassner | G01D 5/2457 324/207.25 |
| 8,250,910 B2 | * | 8/2012 | Rolew | F02D 41/009 702/151 |
| 9,389,098 B2 | * | 7/2016 | Hammerschmidt | H03M 1/28 |
| 9,605,975 B2 | * | 3/2017 | Foletto | G01D 5/142 |
| 2001/0033159 A1 | * | 10/2001 | Forrest | G01D 5/244 324/207.2 |
| 2004/0095130 A1 | * | 5/2004 | Yokotani | G01D 5/147 324/207.21 |
| 2005/0024006 A1 | * | 2/2005 | Blossfeld | G01D 5/2448 318/653 |
| 2005/0061064 A1 | * | 3/2005 | Bruns | F02D 41/0097 73/114.25 |
| 2006/0162701 A1 | * | 7/2006 | Kassner | F02D 41/009 123/479 |
| 2008/0010037 A1 | * | 1/2008 | Hashizume | F02D 41/009 702/151 |
| 2008/0158039 A1 | | 7/2008 | Kassner | |
| 2009/0001965 A1 | * | 1/2009 | Ausserlechner | G01D 5/145 324/202 |
| 2010/0107747 A1 | | 5/2010 | Rolew et al. | |
| 2014/0195186 A1 | * | 7/2014 | Carbonne | G01R 33/091 702/94 |
| 2014/0222364 A1 | * | 8/2014 | Foletto | G01D 5/247 702/104 |
| 2016/0025820 A1 | * | 1/2016 | Scheller | G01P 3/44 324/207.25 |
| 2016/0356628 A1 | * | 12/2016 | Foletto | G01D 5/142 |

* cited by examiner

METHOD FOR COMMUNICATING A MALFUNCTION OF A SYSTEM FOR MEASURING SPEED AND DIRECTION OF ROTATION OF A ROTARY SHAFT

FIELD OF THE INVENTION

The invention relates to a method for communicating a malfunction of a system for measuring speed and direction of rotation of a rotary shaft.

The invention applies more particularly to a system for measuring speed and direction of rotation of a motor vehicle crankshaft.

"System for measuring" should be understood to mean a system comprising a toothed wheel, called target, associated with the crankshaft, and a crankshaft sensor whose operation is explained hereinbelow.

BACKGROUND OF THE INVENTION

The crankshaft sensors are used in a motor vehicle to determine the position of the crankshaft, the speed of rotation and the direction of rotation of the engine. Used in combination with camshaft sensors, they determine the position of the different cylinders in the combustion cycle of the engine (that is to say determining, for each cylinder, whether it is in intake phase, in compression phase, in explosion phase or in exhaust phase) and make it possible to best manage the operation of the engine, by the optimal setting of the ignition advance or of the fuel injection instant.

These crankshaft sensors comprise a magnetic field generator (example: a permanent magnet), a magnetic field detection means (Hall-effect cell, magneto-resistive MR cell, giant magneto-resistive GMR cell, for example) and an electronic circuit for processing the signal received by the magnetic field detection means. These sensors, called active sensors, deliver a digital signal to processing means.

The magnetic field generator can also be a target, consisting of a magnetic material, exhibiting north and south pole alternations. In this case, the sensor may or may not incorporate a permanent magnet depending on the detection means used. Hereinbelow, the north and south poles are compared to the teeth and to the hollows of a mechanical target.

Figure 1:
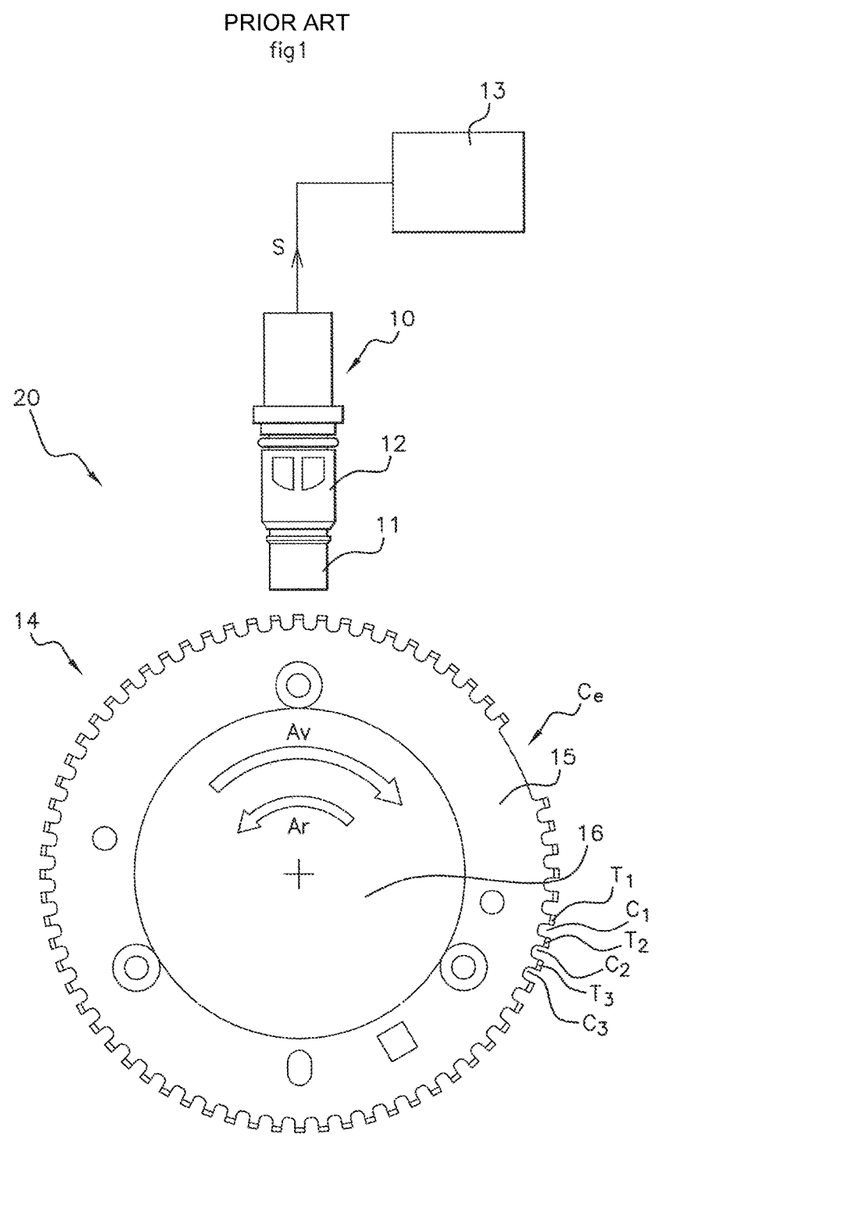

As is known and as illustrated in FIG. 1, a crankshaft sensor 10 is associated with a target 14 secured to a crankshaft 16. This target 14 takes the form of a disk 15 whose periphery is toothed. Between teeth $T_1$, $T_2$, $T_3$, that are substantially identical, there is a space (hollow) $C_1$, $C_2$, $C_3$. The target 14 is distinguished by the presence of a hollow Ce of greater length, more commonly called "missing tooth", positioned precisely at a certain angle relative to the angular position of the engine. According to the embodiment described and represented in FIG. 1, a crankshaft sensor 10 comprises, as is known, a ferromagnetic element 11 and a magnetic field detection means 12 (for example a Hall-effect cell). This sensor 10 delivers a digital signal to one of the processing means 13.

The operation of such a sensor assembly 10 and the associated target 14 is described hereinbelow.

Figure 2:
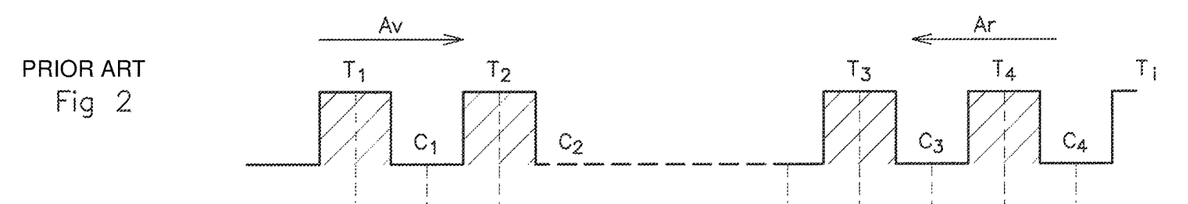

When the target 14 is driven in rotation in one direction (arrow $A_V$ FIG. 1) by the crankshaft 16, the sensor 10 perceives a series of variations of the magnetic field representative of the tooth or teeth $T_1$, $T_2$, $T_3$ passing in front of it and of their spacing $C_1$, $C_2$, $C_3$, $C_e$ (see FIG. 2). The signal that is thus obtained is represented in FIG. 3.

Figure 3:
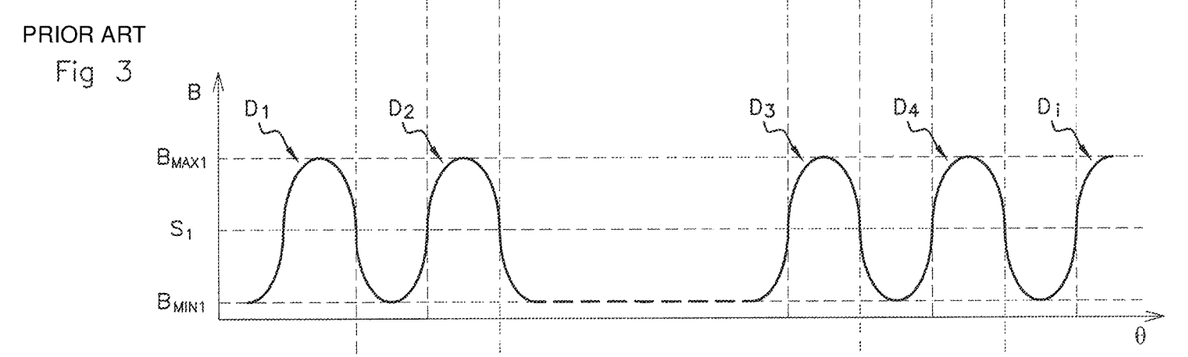

FIG. 3 shows, according to the prior art, the signal B of the magnetic field delivered by the sensor 10 as a function of the angle of rotation θ of the crankshaft 16 (or of the target 14), and the threshold $S_1$ of detection of the rising edge and of the falling edge of the first tooth $T_1$. FIG. 2 represents the position of the teeth $T_1$, $T_2$, ... $T_i$ and of the hollows $C_1$, $C_2$ ... $C_i$ of the target 14 relative to the signal B of the magnetic field of FIG. 3.

As illustrated in FIG. 3, to determine the position of the crankshaft, the signal B representing the variations of the magnetic field perceived by the sensor 10 of the crankshaft 16 is observed during a revolution of the target 14, that is to say according to an angle of rotation θ of the target 14. This signal exhibits a series of sinusoids $D_1$, $D_2$ ... Di each corresponding to the variation of the magnetic field measured by the sensor 10 when a tooth $T_1$, $T_2$ ... $T_i$ (see FIG. 3) followed by a hollow $C_1$, $C_2$ ... $C_i$ passes in front of said sensor 10. By counting the number of sinusoids $D_1$, $D_2$ ... $D_i$, by measuring the duration of each of them, the spacing between each sinusoid $D_1$ $D_2$ ... $D_i$, and by detecting the missing tooth (the spacing due to the missing tooth Ce being longer), it is possible to determine the speed of rotation of the engine, the direction of rotation of the engine and the angular position of the crankshaft.

As illustrated in FIG. 3, the signal B exhibits a minimum $B_{MIN1}$ and a maximum $B_{MAX1}$. The detection of the passage of the teeth $T_1$, $T_2$ ... $T_i$ and of the hollows $C_1$, $C_2$ ... $C_i$ of the target 14 is made by the detection of the passage of the signal B above (respectively below) a detection threshold $S_1$ placed between the minimum $B_{MIN1}$ and the maximum $B_{MAX1}$, for example equal to $S_1=k_1*(B_{MAX1}-B_{MIN1})$, k1 being a constant, for example equal to 0.50.

For explanatory purposes, the signal B illustrated in FIG. 3 comprises a single minimum $B_{MIN1}$ and a single maximum $B_{MAX1}$. In reality, the signal B exhibits a plurality of minimums $B_{MINi}$ and a plurality of maximums $B_{MAXi}$ and the detection threshold $S_1$ is continually adapted according to the minimums and maximums in order to be always equal to $S_1=k1*(B_{MAXi}-B_{MINi})$. This method for adapting the detection threshold $S_1$ is known to those skilled in the art, see patent application FR 2 985 035 A1 filed by the applicant which describes the same method for adapting the detection threshold but applied to a camshaft sensor.

The magnetic field variations perceived by the sensor 10 (signal B in FIG. 3) are processed by the sensor 10, and the latter sends, to the processing means 13, a signal S of voltage 0-5 V (see FIG. 4) comprising pulses I from a high state (5 V) to a low state (0 V). Each pulse I is representative of the passage of the middle of a tooth T1, T2 ... Ti in front of the sensor 10, that is to say the crossing of the detection threshold $S_1$ from the maximum value $B_{MAX1}$ of the signal B to the minimum value $B_{MIN1}$.

When the target 14 revolves in "forward drive mode" (see arrow $A_V$), the pulse I has a first predetermined duration t1, for example 45 μs. When the target 14 revolves in "reverse drive mode" (arrow $A_R$), the pulse I has a second predetermined duration t2, for example 90 μs.

The detection of the direction of rotation of the target 14 "forward" or "reverse" is known to those skilled in the art, and will not be described in detail here. In effect, the sensor 10 generates a second signal, called direction signal (not represented), whose phase difference with respect to the signal S indicates the direction of rotation of the target 14.

The processing means 13 receive the signal S and the direction signal and then determine the speed of rotation, the direction of rotation of the crankshaft, that is to say of the engine.

Upon an electrical malfunction of the sensor 10, that is to say a short circuit to ground, or an open circuit, the signal S at the output of the sensor 10 takes either the value 0 V or the value 5 V (respectively).

However, such a sensor 10 does not provide information to the processing means 13 regarding any malfunction of the system 20 for measuring speed and direction of rotation of the crankshaft.

Malfunction of the system should be understood to mean:
  an air gap defect (also called air gap distance defect) or defect of alignment between the sensor 10 and the target 14 or misaligned therewith, the sensor 10 is in this case too far away from the target 14, and the variations of the magnetic field perceived by the sensor 10 are too weak to accurately determine the speed and the direction of rotation of the crankshaft,
  a "radial runout" or defect of eccentricity of the target 14, the target is then fixed onto the crankshaft in such a way that when it revolves, it oscillates in its plane, or it is not centered on the axis of the crankshaft, in these two cases, the variations of the magnetic field over a revolution of the target 14 are significant and affect the accuracy of the signal S. As for the preceding defects, the determination of the speed and of the direction of rotation of the crankshaft can prove impossible.

SUMMARY OF THE INVENTION

The aim of the invention is to remedy these problems. The invention proposes a method for communicating a malfunction of the system for measuring speed and direction of rotation of a crankshaft to processing means that is inexpensive, that makes it possible to signal to the processing means 13 an air gap defect or a defect of alignment between the sensor 10 and the target 14, and a defect of eccentricity or "radial runout" of the target 14.

The invention proposes a method for communicating a malfunction of a system for measuring speed and direction of rotation of a rotary shaft to processing means, said system comprising:
  a toothed wheel associated with said rotary shaft, called target,
  a magnetic field sensor, measuring values of the magnetic field generated by the passage of the teeth in front of said sensor and delivering a signal to the processing means, said signal comprising pulses between a high state and a low state, each pulse being representative of the passage of a tooth in front of the sensor, and each pulse having two predetermined durations, a first duration representative of a first direction of rotation of the target, and a second duration representative of the opposite direction of rotation of the target.

According to the invention, the detection method comprises the following steps:
  step 1: comparison by the sensor between the measured values of the magnetic field and predetermined threshold values of the magnetic field,
  step 2: if the measured values of the magnetic field are below the predetermined threshold values of the magnetic field, then
  step 3: generation by the sensor, in a direction of rotation, of a coding of the signal, representative of the measured values of the magnetic field, by using at least one third pulse duration and at least one fourth pulse duration in order to communicate a malfunction of the system for measuring speed and direction of rotation of the rotary shaft to the processing means.

Thus, the invention lies in the use of additional pulse durations on the signal at the output of the sensor in order to produce a coding intended for the processing means. This coding represents the abnormal measured values of the magnetic field (because they are below the predetermined threshold values, representative of normal operation of the system). The processing means then decode the received signal and deduce therefrom the abnormal measured values of the magnetic field. The malfunction communication method according to the invention therefore makes is possible for the processing means to diagnose a number of malfunctions of the system for measuring speed and direction of rotation of a rotary shaft by virtue of the specific coding produced by the sensor.

In a preferential embodiment of the invention, the coding is binary (0, 1), the third predetermined duration having the value "0", and the fourth predetermined duration having the value "1".

One of the measured values of the magnetic field can be the amplitude of the magnetic field during at least one revolution of the target or can be the ratio between the minimum amplitude of the magnetic field and the maximum amplitude of the magnetic field during at least one revolution of the target.

Shrewdly, the third predetermined duration and the fourth predetermined duration are computed as a function of the time between the passage of two consecutive teeth at a maximum speed of rotation of the crankshaft.

The invention relates also to a magnetic field sensor of a system for measuring speed and direction of rotation of a rotary shaft, measuring values of the magnetic field generated by the passage of the teeth of a toothed wheel, called target, associated with said rotary shaft, in front of said sensor and delivering a signal to processing means, said signal comprising pulses between a high state and a low state, each pulse being representative of the passage of a tooth in front of the sensor, and each pulse having two predetermined durations, a first duration representative of a first direction of rotation of the rotary shaft, and a second duration representative of the opposite direction of rotation of the rotary shaft, according to the invention the sensor comprises:
  storage means for predetermined threshold values of the magnetic field,
  comparison means between the measured values of the magnetic field and the predetermined threshold values of the magnetic field,
  means for generating at least one third predetermined pulse duration and at least one fourth predetermined pulse duration, to produce a binary coding of the signal, representative of the measured values of the magnetic field, intended for the processing means.

The invention applies to any motor vehicle comprising a magnetic field sensor according to the features itemized above.

BRIEF DESCRIPTION OF THE DRAWINGS

Other features and advantages of the invention will become apparent on reading the following description and on studying the attached drawings in which:

FIG. 1, explained previously, is a schematic cross-sectional view, representing a sensor 10 of a crankshaft 16 and its associated target 14, FIG. 2, explained previously, represents the position of the teeth $T_1, T_2 \ldots T_i$ and of the hollows $C_1, C_2 \ldots C_i$ of the target 14, FIG. 3, explained previously, represents, according to the prior art, the signal B delivered by the sensor 10 as a function of the angle of rotation θ of the crankshaft 16 (or of the target 14), and the detection threshold $S_1$ for the rising and falling edges, relative to the passage of teeth $T_1$, $T_2 \ldots T_i$ and of the hollows $C_1, C_2 \ldots C_i$ of the target 14 of FIG. 2 in front of the sensor 10, FIG. 4, explained previously, represents the signal S delivered by the sensor 10 to the processing means 13.

DETAILED DESCRIPTION OF THE INVENTION

FIG. 1 illustrates a system 20 for measuring speed and direction of rotation of a crankshaft comprising:
- a toothed wheel associated with the crankshaft (not represented), called target 14,
- a magnetic field sensor 10 or crankshaft sensor measuring values of the magnetic field, for example the intensity of the magnetic field, generated by the passage of the teeth $C_1, C_2 \ldots C_i$ of the target 14 in front of said sensor 10.

Figure 4:
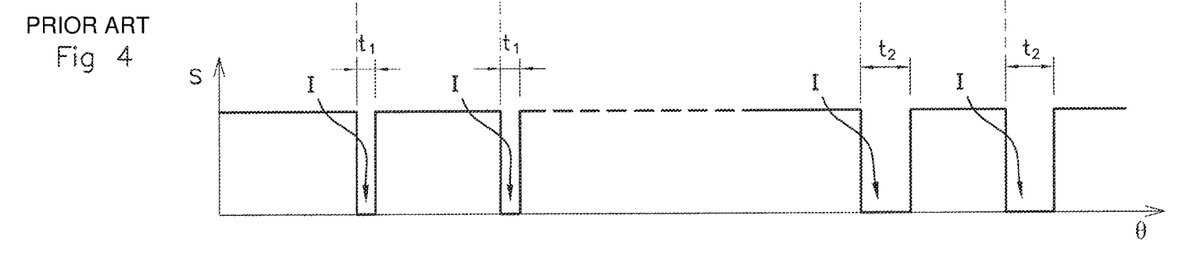

The sensor 10 delivers a 0-5 V signal S to processing means 13, said signal comprises pulses I between a high state (5 V) and a low state, for example from a high state to a low state (0 V) (see FIG. 4). Each pulse I is representative of the passage of a tooth $T_1, T_2 \ldots T_i$ (more specifically of the passage of half of a tooth) in front of the sensor 10, and each pulse I has two predetermined durations, a first predetermined duration t1, representative of a first direction of rotation of the target 14, for example forward $A_V$ and a second predetermined duration t2, representative of the opposite direction of rotation of the target 14, that is to say reverse $A_R$.

The signal S is received by the processing means 13 which deduces therefrom the speed and the direction of rotation of the crankshaft.

This is known to those skilled in the art and has been described previously.

The invention will be described below by taking as example of malfunction of the system 20, first, a malfunction of air gap defect type, then, secondly, a malfunction of "radial runout" of the target 14 (i.e. of the crankshaft) type.

Figure 5:
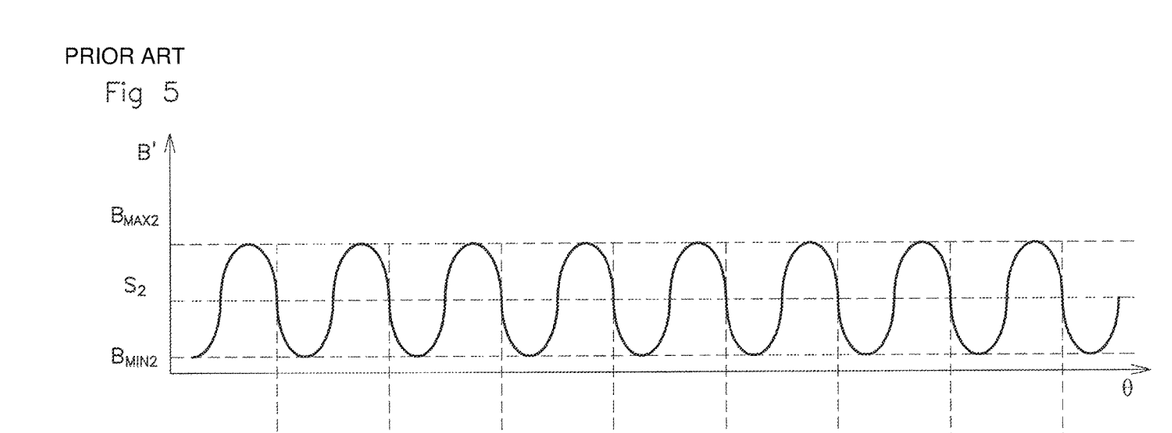
FIG. 5 represents the variations of the magnetic field B' perceived by the sensor 10 according to the angle of rotation θ of the crankshaft 16, upon a malfunction of the system, due to an air gap defect between the sensor 10 and the target 14.

In the case of an air gap defect, the sensor 10 is abnormally far away from the target 14. This can occur when mounting the sensor 10. Because of the distance of the sensor 10 from the target 14 the sensor perceives, from the target 14, a weakened magnetic field B', of low intensity. This is represented in FIG. 5. The amplitude value A measured by the sensor 10, that is to say the difference between the maximum value of the magnetic field $B_{MAX2}$ and the minimum value of the magnetic field $B_{MIN2}$, i.e. $A=(B_{MAX2}-B_{MIN2})$, is greatly reduced relative to the amplitude value of the magnetic field B of the prior art $A_{ref}=(B_{MAX1}-B_{MIN1})$, i.e.:

$$(B_{MAX2}-B_{MIN2}) < (B_{MAX1}-B_{MIN1})$$

The value of the detection threshold S2 in the presence of this air gap defect is much smaller than that of the detection threshold (S1) for a normal air gap, which renders the detection of the teeth $T_1, T_2 \ldots T_i$ of the target 14 more inaccurate.

The invention proposes that the sensor 10' compares the measured value A of the magnetic field B', in this example, the amplitude of the magnetic field $A=B_{MAX2}-B_{MIN2}$, and compares it to a predetermined amplitude threshold value representative of the absence of air gap defect, this amplitude threshold value corresponding to the minimum amplitude of the magnetic field, for example here $A_{ref}=B_{MAX1}-B_{MIN1}$, obtained with a maximum air gap distance.

To this end, the sensor 10' according to the invention comprises, in software form, storage means 30 (see FIG. 9) for predetermined threshold values of the magnetic field B (here, the amplitude threshold value $A_{ref}$) and comparison means 31 (see FIG. 9), between the measured values (here the amplitude A) of the magnetic field B' and the predetermined threshold values $A_{ref}$ of the magnetic field B.

If the measured value, here the amplitude A of the magnetic field B', is below the predetermined amplitude threshold value $A_{ref}$, the sensor 10' informs the processing means 13 thereof by producing, on the output line of the signal S', a coding representative of the measured value, that is to say of the measured amplitude A of the magnetic field B'.

To this end, the sensor 10' generates, on the signal S, pulses I of predetermined durations, by using a third predetermined duration t3, for example equal to 135 μs and a fourth predetermined duration t4, for example equal to 170 μs, different from the first predetermined duration t1=45 μs indicating the "forward" direction of rotation $A_V$ of the target 14, and different from the second predetermined duration t2=90 μs, indicating the "reverse" direction of rotation $A_R$ of the target 14. The generation of these third t3 and fourth t4 predetermined durations is performed by generation means 32 (see FIG. 9) of software type incorporated in the sensor 10.

In the nonlimiting example below, the coding produced is a binary coding, using a succession of pulses I of third t3 and of fourth t4 predetermined durations.

Figure 6:
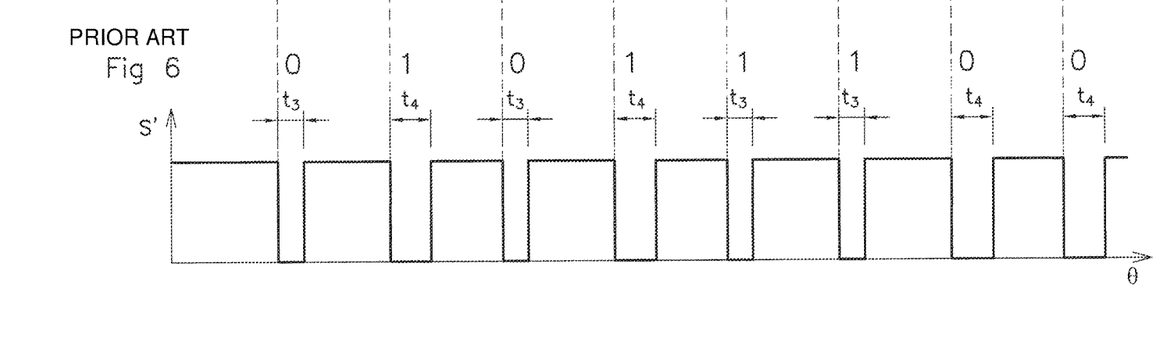
FIG. 6 represents, according to the invention, the binary coding of the malfunction illustrated in FIG. 5, produced by the sensor 10 on the signal S' intended for the processing means.

This is illustrated in FIG. 6. Once the sensor 10' has detected that the amplitude A of the measured magnetic field B' was below the predetermined amplitude threshold value $A_{ref}$ of the magnetic field B for a normal air gap, it generates, on its signal S output line, a binary code representative of the measured amplitude A of the magnetic field, by assigning the value "0" for example to the third predetermined duration t3, and a value "1" to the fourth predetermined duration t4.

In FIG. 6, the binary code produced is on 8 bits, and consists of "0 1 0 1 1 1 0 0". This code is received by the processing means 13, which extracts therefrom the value of the measured amplitude A and sends to a central unit a message indicating air gap defect between the sensor 10 and the target 14.

Figures 7, 8:
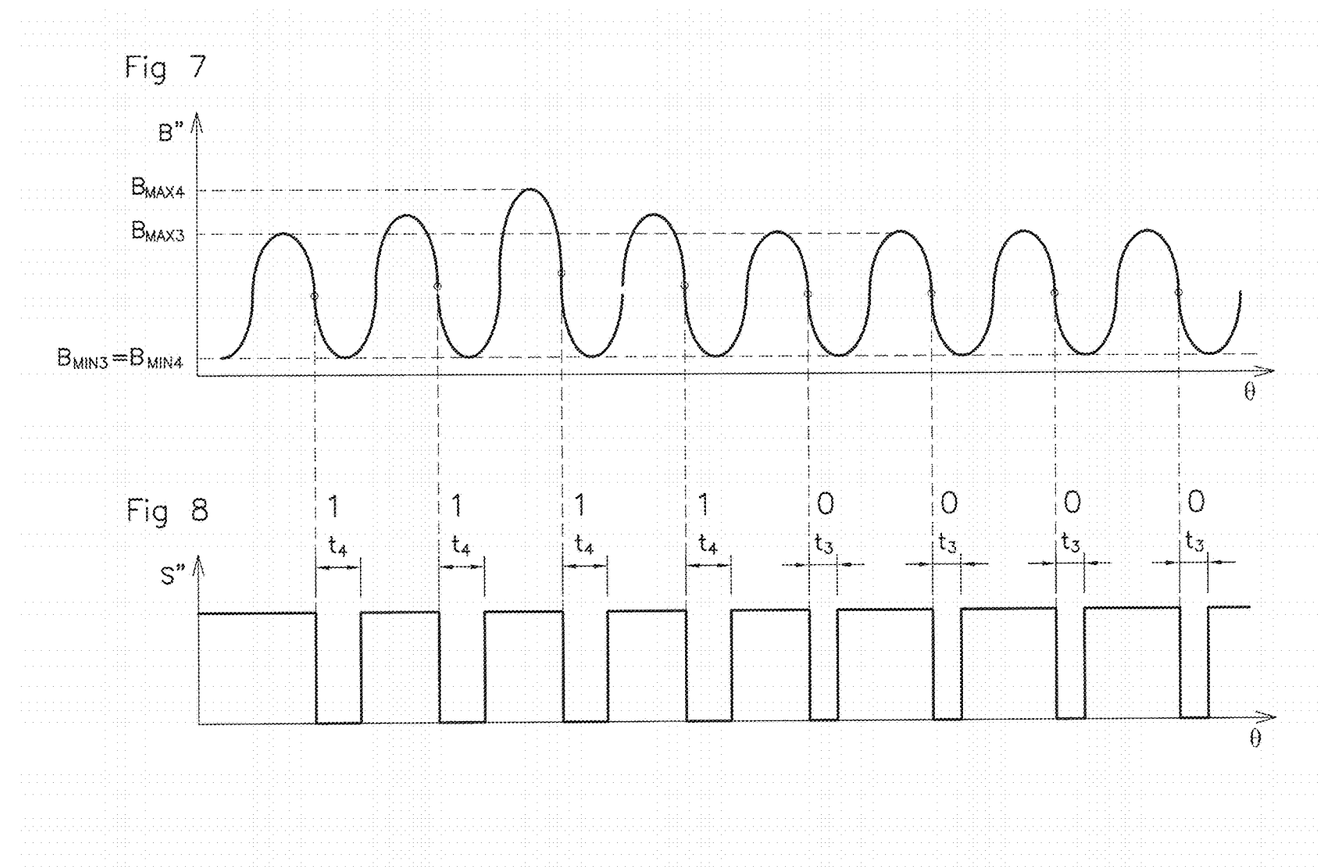
FIG. 7 represents the variations of the magnetic field B'' perceived by the sensor 10 according to the angle of rotation of the target, upon a malfunction of the system, due to a "radial runout" of the target (or of the crankshaft)
FIG. 8 represents, according to the invention, the binary coding of the malfunction illustrated in FIG. 7, produced by the sensor 10 on the signal S' intended for the processing means.

FIG. 7 illustrates the variations of the magnetic field B'' perceived by the sensor 10 in the case of a malfunction of the system, of "radial runout" type.

In this case, the amplitude of the magnetic field B" is not constant, it varies between a maximum amplitude $A_{MAX}=B_{MAX4}-B_{MIN4}$ and a minimum amplitude $A_{MIN}=B_{MAX3}-B_{MIN3}$.

In this case, the sensor 10' compares the ratio between the minimum amplitude and the maximum amplitude of the measured magnetic field B", i.e.

$$K = \frac{A_{MIN}}{A_{MAX}} = \frac{(B_{MAX3} - B_{MIN3})}{(B_{MAX4} - B_{MIN4})}$$

with a predetermined ratio threshold value $K_{ref}$.

The predetermined ratio threshold value $K_{ref}$ represents the minimum ratio between the minimum amplitude and the maximum amplitude of the magnetic field B, obtained without "radial runout" type system malfunction.

In the example illustrated in FIG. 8, $K < K_{ref}$, for example $K_{ref}$ is equal to 0.7.

The binary coding produced on the signal S" representative of the value of the amplitude ratio K and illustrated in FIG. 8, is for example equal to "1 1 1 1 0 0 0 0".

This binary code is received by the processing means 13 which extracts therefrom the value of the amplitude ratio K and sends a "radial runout" defect message to a central unit.

Obviously, the sensor 10' can use a plurality of predetermined durations, depending on the complexity of the code and therefore of the message to be transmitted to the processing means 13.

It is important to note that the binary coding can be produced only in one direction of rotation of the target 14, for example forward $A_V$. In effect, by generating the defect binary code, that is to say by replacing the predetermined pulse duration representative of the direction of rotation of the target 14 (either the first predetermined duration t1 or the second predetermined duration t2) by the third and fourth predetermined durations t3, t4, representative of the defect, the processing means 13 no longer receive the information concerning the direction of rotation of the target 14. This is resolved by the invention, by producing the binary coding only in a given direction of rotation, for example forward $A_V$.

When the direction of rotation of the target 14 changes, and switches from forward $A_V$ to reverse $A_R$, the coding is interrupted. The detection of the direction of rotation of the target 14 is known to those skilled in the art and has been described previously.

Furthermore, the value of the third predetermined duration t3 and of the fourth predetermined duration t4 must be calculated so as to be less than the duration between two successive teeth as the maximum speed of rotation (for example 4000 rpm or 6000 rpm) of the target 14, in order to be able to signal any defect of the system at this maximum speed.

According to the invention, the method for communicating a malfunction of a system for measuring the speed and the direction of rotation of a rotary shaft, in our example, a crankshaft, with processing means, therefore comprises the following steps:

step 1: comparison by the sensor 10' between the measured values of the magnetic field and predetermined threshold values of the magnetic field, step 2: if the measured values of the magnetic field are below the predetermined threshold values of the magnetic field, then step 3: generation by the sensor 10', in a direction of rotation of the target 14, of a coding of the signal S', S", representative of the measured values of the magnetic field, by using at least one third pulse duration t3 and at least one fourth pulse duration t4 in order to communicate a malfunction of the system for measuring speed and direction of rotation of the rotary shaft to the processing means 13.

Figure 9:
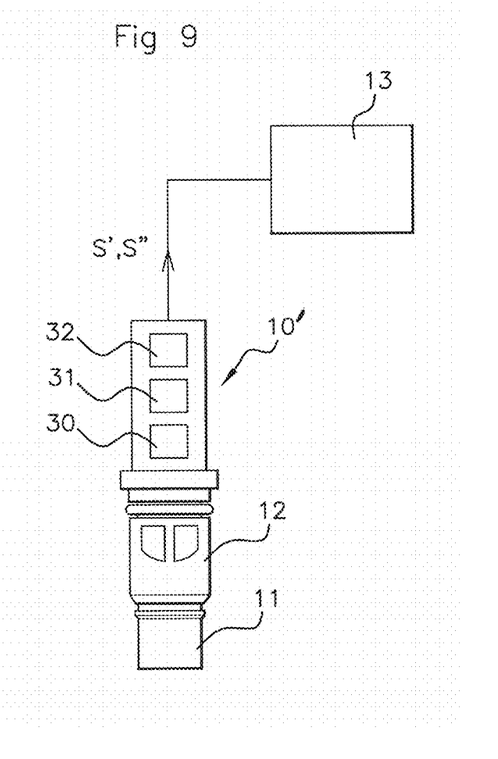
FIG. 9 represents the magnetic field sensor 10' according to the invention.

To implement the communication method according to the invention, the sensor 10' comprises:
storage means 30 for predetermined threshold values $A_{ref}$, $K_{ref}$ of the magnetic field,
comparison means 31 between the measured values A, K of the magnetic field and the predetermined threshold values $A_{ref}$, $K_{ref}$ of the magnetic field,
means 32 for generating at least one third predetermined pulse duration t3 and at least one fourth predetermined pulse duration t4, to produce a binary coding of the signal S', S", representative of the measured values A, K of the magnetic field intended for the processing means 13.

Obviously, the measured values of the magnetic field may be different from the amplitude or from the amplitude ratio (ratio between the minimum amplitude and the maximum amplitude) of the magnetic field. Depending on the measured values and the predetermined threshold values of the magnetic field, the step 3 can be carried out when the measured values are above the predetermined threshold values. Such is the case, for example, if the chosen measured value is the ratio of amplitude between the maximum amplitude and the minimum amplitude.

Obviously, it is possible to envisage setting the predetermined threshold values $A_{ref}$, $K_{ref}$ of the magnetic field B such that all the measured values A, K of the magnetic field B are below the predetermined threshold values $A_{ref}$, $K_{ref}$. In this case, for example, after each first revolution of the target 14, the sensor 10' informs the processing means 13 of the measured values A, K by producing the coding of the measured values A, K on the signal S.

The invention can therefore be implemented by simple modification of the software included in the sensor 10'. Obviously, the processing means 13 are adapted to decode the signal S', S" from the sensor 10'.

The invention therefore makes it possible to communicate a malfunction of the system for measuring the speed and the direction of rotation of the crankshaft to the processing means, in this case more particularly an assembly defect, incorrect air gap between the sensor and the target, "radial runout" defect, or defect of eccentricity of the target 14 and this at low cost, since, to carry out the malfunction communication method according to the invention, only modifications of software type need to be made to the sensor.

The invention claimed is:

1. A method for communicating a malfunction of a system for measuring speed and direction of rotation of a rotary shaft to processing means (13), said system comprising:
a toothed wheel associated with said rotary shaft, called target (14),
a magnetic field sensor (10, 10'), measuring values (K, A) of the magnetic field (B, B', B") generated by the passage of the teeth (T1, T2 . . . Ti) in front of said sensor (10') and delivering a signal (S, S', S") to the processing means (13), said signal (S, S', S") comprising pulses (I) between a high state and a low state, each pulse (I) being representative of the passage of a tooth (T1, T2 . . . Ti) in front of the sensor (10'), and each pulse (I) having two predetermined durations, a first duration (t1) representative of a first direction of rotation of the target (14), and a second duration (t2) representative of the opposite direction of rotation of the target (14), wherein the detection method comprises the following steps:

step 1: comparison by the sensor (10') between the measured values (A, K) of the magnetic field (B, B', B") and predetermined threshold values ($A_{ref}$, $K_{ref}$) of the magnetic field (B, B', B"), step 2: if the measured values (A, K) of the magnetic field (B, B', B") are below the predetermined threshold values ($A_{ref}$, $K_{ref}$) of the magnetic field (B, B', B"), then step 3: generation by the sensor (10'), in a direction of rotation of the target (14), of a coding of the signal (S', S"), representative of the measured values (A, K) of the magnetic field (B, B', B"), by using at least one third pulse duration (t3) and at least one fourth pulse duration (t4) in order to communicate a malfunction of the system for measuring speed and direction of rotation of the rotary shaft to the processing means (13).

2. The detection method, as claimed in claim 1, wherein the coding is binary (0, 1), the third predetermined duration (t3) having the value "0", and the fourth predetermined duration (t4) having the value "1".

3. The detection method, as claimed in claim 2, wherein one of the measured values (A) of the magnetic field (B, B', B") is the amplitude of the magnetic field (B, B', B") during at least one revolution of the target (14).

4. The detection method, as claimed in claim 2, wherein one of the measured values (K) of the magnetic field (B, B', B") is the ratio between the minimum amplitude ($A_{MIN}$) of the magnetic field and the maximum amplitude ($A_{MAX}$) of the magnetic field during at least one revolution of the target (14).

5. The detection method, as claimed in claim 2, wherein the third predetermined duration (t3) and the fourth predetermined duration (t4) are computed as a function of the time between the passage of two consecutive teeth (T1, T2 . . . Ti) at a maximum speed of rotation of the target (14).

6. The detection method, as claimed in claim 1, wherein one of the measured values (A) of the magnetic field (B, B', B") is the amplitude of the magnetic field (B, B', B") during at least one revolution of the target (14).

7. The detection method, as claimed in claim 6, wherein the third predetermined duration (t3) and the fourth predetermined duration (t4) are computed as a function of the time between the passage of two consecutive teeth (T1, T2 . . . Ti) at a maximum speed of rotation of the target (14).

8. The detection method, as claimed in claim 1, wherein one of the measured values (K) of the magnetic field (B, B', B") is the ratio between the minimum amplitude ($A_{MIN}$) of the magnetic field and the maximum amplitude ($A_{MAX}$) of the magnetic field during at least one revolution of the target (14).

9. The detection method, as claimed in claim 8, wherein the third predetermined duration (t3) and the fourth predetermined duration (t4) are computed as a function of the time between the passage of two consecutive teeth (T1, T2 . . . Ti) at a maximum speed of rotation of the target (14).

10. The detection method, as claimed in claim 1, wherein the third predetermined duration (t3) and the fourth predetermined duration (t4) are computed as a function of the time between the passage of two consecutive teeth (T1, T2 . . . Ti) at a maximum speed of rotation of the target (14).

11. A magnetic field sensor (10') of a system for measuring speed and direction of rotation of a rotary shaft, measuring values (A, K) of the magnetic field generated by the passage of the teeth (T1, T2 . . . Ti) of a toothed wheel associated with said rotary shaft, called target (14), in front of said sensor (10) and delivering a signal (S, S', S") to processing means (13), said signal (S, S', S") comprising pulses (I) between a high state and a low state, each pulse (I) being representative of the passage of a tooth (T1, T2 . . . Ti) in front of the sensor (10'), and each pulse (I) having two predetermined durations, a first duration (t1) representative of a first direction of rotation of the target (14), and a second duration (t2) representative of the opposite direction of rotation of the target (14), wherein said sensor (10) comprises:

storage means (30) for predetermined threshold values ($A_{ref}$, $K_{ref}$) of the magnetic field (B, B', B"), comparison means (31) between the measured values (A, K) of the magnetic field (B, B', B") and the predetermined threshold values ($A_{ref}$, $K_{ref}$) of the magnetic field (B, B', B"), means (32) for generating at least one third predetermined pulse duration (t3) and at least one fourth predetermined pulse duration (t4), to produce a binary coding of the signal (S', S"), representative of the measured values (A, K) of the magnetic field (B, B', B"), intended for the processing means (13).

12. A motor vehicle comprising a magnetic field sensor (10') as claimed in claim 11.

* * * * *